(12) United States Patent
Yanagida

(10) Patent No.: US 7,486,349 B2
(45) Date of Patent: Feb. 3, 2009

(54) POLYMER NETWORK LIQUID CRYSTAL ELEMENT WITH PREDETERMINED GAP FOR DIMMING DEVICE HAVING IMAGE PROCESSING, TEMPERATURE DETECTING AND PULSE WIDTH CONTROL UNITS THEREFOR

(75) Inventor: Toshiharu Yanagida, Tokyo (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 10/539,878

(22) PCT Filed: Dec. 12, 2003

(86) PCT No.: PCT/JP03/15917
§ 371 (c)(1),
(2), (4) Date: Jun. 15, 2005

(87) PCT Pub. No.: WO2004/055578
PCT Pub. Date: Jul. 1, 2004

(65) Prior Publication Data
US 2006/0152649 A1 Jul. 13, 2006

(30) Foreign Application Priority Data
Dec. 16, 2002 (JP) .............................. 2002-363995

(51) Int. Cl.
*G02F 1/133* (2006.01)

(52) U.S. Cl. .............................. 349/72; 349/86; 349/88

(58) Field of Classification Search ............... 349/72, 349/86–89
See application file for complete search history.

(56) References Cited
U.S. PATENT DOCUMENTS

| | | | | |
|---|---|---|---|---|
| 6,088,075 A | * | 7/2000 | Nakao et al. | 349/86 |
| 6,128,056 A | * | 10/2000 | Kubota et al. | 349/86 |
| 6,414,740 B1 | * | 7/2002 | Hosoyamada | 349/161 |
| 2002/0097369 A1 | * | 7/2002 | Yanagida et al. | 349/165 |

FOREIGN PATENT DOCUMENTS

EP 2001209035 1/2000
(Continued)

OTHER PUBLICATIONS

Communication dated May 29, 2007 for Application No. 03778854.4-2205.

*Primary Examiner*—David Nelms
*Assistant Examiner*—John Heyman
(74) *Attorney, Agent, or Firm*—Sonnenschein Nath & Rosenthal LLP

(57) ABSTRACT

To provide a light control device including a liquid crystal element which does not need a polarizing plate and an alignment layer and is compact and high in contrast ratio, and can be driven at low applied voltage and can exhibit stable performance even if environmental temperature varies, and a driving method for the light control device, as well as an image pickup apparatus using the light control device. A liquid crystal cell (1) is fabricated by injecting a mixture in which liquid crystal, a polymer precursor, and a polymerization initiator into an empty cell constituted by two transparent substrates (8) which are stuck together with a gap of 4-11 μm and on each of whose opposed surfaces a transparent electrode (9) is formed, and the polymer precursor is polymerized and then a random three-dimensional network polymer (3) is formed in the continuous layer of liquid crystal (2). The liquid crystal cell (1) is driven by applying a voltage according to the environmental temperature. When driving voltage is off, the liquid crystal molecules (2) are aligned along the wall surfaces of the polymer (3), the network polymer (3) forms light scattering interfaces, on the other hand, when driving voltage is on, the liquid crystal molecules are oriented in a predetermined direction with respect to the electric field, so that the refractive index becomes constant in the traveling direction of light, whereby incident light (5) passes through without being scattered.

8 Claims, 12 Drawing Sheets

FOREIGN PATENT DOCUMENTS

| | | |
|---|---|---|
| JP | 06-003651 | 1/1994 |
| JP | 09-068701 | 3/1997 |
| JP | 09-304753 | 11/1997 |
| JP | 11-112849 | 4/1999 |
| WO | WO 00/07065 | 2/2000 |

* cited by examiner

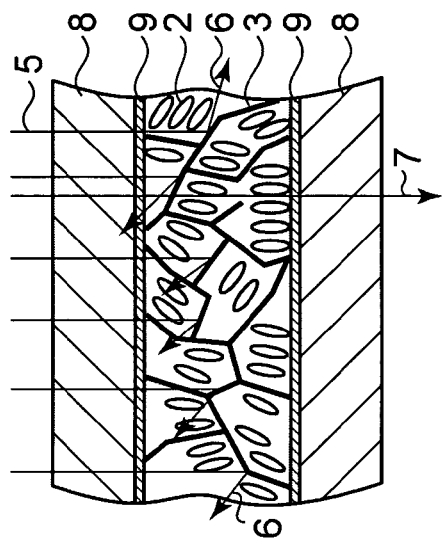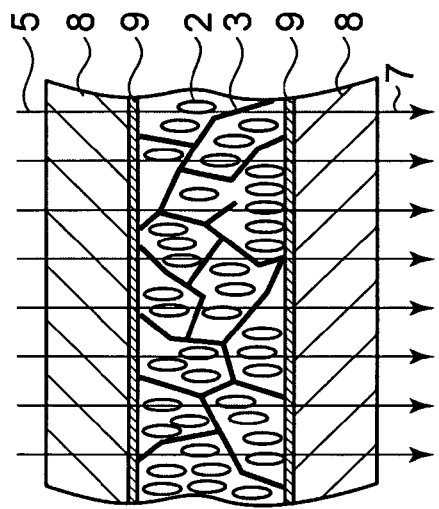
Fig.1A  Fig.1B
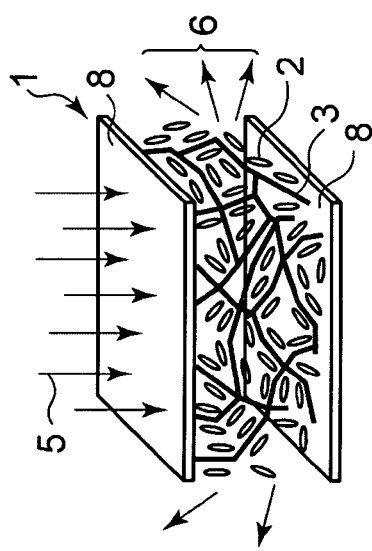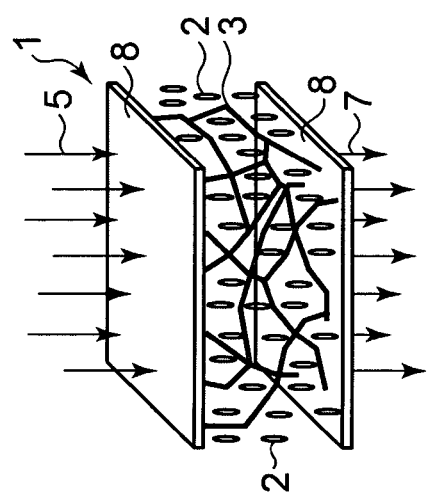
Fig.1C  Fig.1D

POLYMER NETWORK LIQUID CRYSTAL ELEMENT WITH PREDETERMINED GAP FOR DIMMING DEVICE HAVING IMAGE PROCESSING, TEMPERATURE DETECTING AND PULSE WIDTH CONTROL UNITS THEREFOR

TECHNICAL FIELD

The present invention relates to a light control device using, for example, a liquid crystal optical element for adjusting the light amount of incident light and allowing adjusted light to radiate through, and a driving method for the light control device, as well as an image pickup apparatus using this light control device.

BACKGROUND ART

Light control devices using liquid crystal optical elements (liquid crystal cells) generally use polarizing plates. As these liquid crystal cells, for example, TN (Twisted Nematic) liquid crystal cells and guest-host (GH (Guest Host)) liquid crystal cells are used.

FIGS. 8A and 8B are schematic views showing the operating principle of a related art light control device.

This light control device is mainly made of a polarizing plate 11 and a GH cell 12a of positive liquid crystal. The GH cell 12a is sealed between two glass substrates which are not shown, and has operating electrodes and liquid crystal alignment films none of which are shown. Liquid crystal molecules 13a and dichroic dye molecules 14 are sealed in the GH cell 12a ($\Delta\epsilon>0$).

The liquid crystal molecules 13a which serve as a host material are of the positive type which have positive dielectric constant anisotropy. The dichroic dye molecules 14 which serve as a host material has anisotropy in absorption of light, and may be of the positive type (p type) or the negative type (n type). FIGS. 8A and 8B show an example of positive (p type) pigment molecules which absorb light in the direction of their long molecular axis ($\Delta A>0$).

On the other hand, FIG. 8A shows the state of the GH cell 12a to which voltage is not applied.

Incident light 5 is changed into linearly polarized light by being filtered while passing through the polarizing plate 11. The polarization direction of the polarized light coincides with the direction of the long molecular axis of the dichroic dye molecules 14, so that the polarized light is easily absorbed by the dichroic dye molecules 14. Accordingly, the light transmittance of the GH cell 12a is low during the state of FIG. 8A in which voltage is not applied.

FIG. 8B shows the state of the GH cell 12a to which voltage is applied. When voltage is applied to the GH cell 12a, the liquid crystal molecules 13a are aligned in the direction of the electric field, so that the direction of the long molecular axis of the dichroic dye molecules 14 becomes orthogonal to the polarization direction of light. Accordingly, polarized light is hardly absorbed by the dichroic dye molecules 14 and is allowed to pass through. Accordingly, the light transmittance of the GH cell 12a is high during the state of FIG. 8B in which voltage is applied.

Incidentally, negative (n-type) pigment molecules which absorb light in the direction of their short molecular axis may also be used as the dichroic dye molecules. In this case, the light transmittance is opposite to that in the case where positive pigment molecules are used. Light is not easily absorbed during the non-application of voltage, but during the application of voltage, light is easily absorbed.

In the light control device shown in FIGS. 8A and 8B, the ratio of absorbance during the application of voltage to that during the non-application of voltage, i.e., the ratio of optical densities, is approximately 10. This light control device has an approximately two-fold optical density ratio compared to a light control device which does not use the polarizing plate 11 and is made of only a GH cell 12b.

FIG. 9 is a graph in which the light transmittance of the GH cell 12a shown in FIGS. 8A and 8B to which driving pulses of rectangular waves are applied is plotted against driving pulse voltage. An average visible light transmittance (a value in the air: the transmittance obtained when an empty liquid crystal cell and a polarizing plate are placed in an optical path is defined as a reference transmittance (=100%), and this definition applies to the following description as well) increases with the increase of the driving pulse voltage, but the maximum light transmittance obtained when the driving pulse voltage is increased to 10 V is as low as approximately 60% and the variation of the light transmittance is modest.

A cause of this is considered to be that since positive liquid crystal molecules exhibit strong interactions with the interface of a liquid crystal cell with a liquid crystal alignment film during the non-application of voltage, a comparatively large number of liquid crystal molecules whose director, even if a voltage is applied, does not at all vary or does not easily vary in its direction are contained in the positive liquid crystal molecules.

The present applicant has conducted intensive research and proposed a light control device using a negative liquid crystal as its host material, as well as an image pickup apparatus using this light control device (refer to Patent Document 1. This invention which relates to Patent Document 1 is hereinafter referred to as the invention of the first prior application.)

FIGS. 10A to 10C are schematic views showing the operating principle of a light control device based on the invention of the prior application. This light control device is mainly made of the polarizing plate 11 and a GH cell 12b similarly to the related art light control device of FIGS. 8A and 8B. Liquid crystal molecules 13b ($\Delta\epsilon<0$) of the negative type which have negative dielectric constant anisotropy and serve as a host material and dichroic dye molecules 14 ($\Delta A=A//-A\perp>0$) of the positive or negative type which serve as a guest material are sealed in the GH cell 12b. FIGS. 10A and 10B show the case in which the dichroic dye molecules 14 are pigment molecules of the positive type (p type).

FIG. 10A shows the state of the GH cell 12b to which voltage is not applied.

The incident light 5 is changed into linearly polarized light by being filtered while passing through the polarizing plate 11. The polarization direction of the polarized light is orthogonal to the direction of the long molecular axis of the dichroic dye molecules 14, so that the polarized light is hardly absorbed by the dichroic dye molecules 14 and is allowed to pass through. Accordingly, the light transmittance of the GH cell 12b is high during the state of FIG. 10A in which voltage is not applied.

On the other hand, FIG. 10B shows the state of the GH cell 12b to which voltage is applied. When voltage is applied to the GH cell 12b, the liquid crystal molecules 13b are aligned to become orthogonal to the direction of the electric field, so that the direction of the long molecular axis of the dichroic dye molecules 14 coincides with the polarization direction of light. Accordingly, polarized light is easily absorbed by the dichroic dye molecules 14. Accordingly, the light transmittance of the GH cell 12b is low during the state of FIG. 10B in which voltage is applied.

Incidentally, negative (n-type) pigment molecules may also be used as the dichroic dye molecules. In this case, the light transmittance is opposite to that in the case where positive pigment molecules are used.

FIG. 11 is a graph in which the light transmittance of the GH cell 12b of FIGS. 10A and 10B to which the driving pulses of rectangular waves shown in FIG. 10C are applied is plotted against driving pulse voltage. At this time, as one example of the negative liquid crystal 13b having negative dielectric constant anisotropy ($\Delta\epsilon$), MLC-6608 manufactured by Merck KGaA is used as a host material, while D5 manufactured by BDH Chemical Co. Ltd. is used as one example of the dichroic dye molecules 14 having positive light absorption anisotropy ($\Delta A$). As shown in FIG. 11, an average visible light transmittance decreases to several % from a maximum light transmittance of approximately 75% with the increase of the driving pulse voltage, and the variation of the light transmittance is comparatively sharp.

A cause of this is considered to be that since negative liquid crystal molecules exhibit very weak interactions with the interface of a liquid crystal cell with a liquid crystal alignment film during the non-application of voltage, light is allowed to pass through during the non-application of voltage, and the director of the liquid crystal molecules is easily varied in its direction by the application of voltage.

Accordingly, according to the invention of the first prior application, by constructing a guest-host liquid crystal cell by using a negative liquid crystal as a host material, it is possible to realize a compact light control device which is improved in light transmittance during its transparent state in particular and which enables a GH cell to be fixed in position in an image pickup optical system.

As described previously, in light control devices using GH cells, it is possible to realize an approximately two-fold optical density ratio (the ratio of absorbance during the application of voltage to that during the non-application of voltage) by using polarizing plates, compared to the cases in which polarizing plates are not used. However, if a polarizing plate is used, at least half light is lost down to a light transmittance of, for example, 40-50%, so that a remarkable decrease in light amount occurs. Accordingly, if the polarizing plate is constantly placed in the optical path of a light control device, there is the problem that the maximum transmittance of the light control device is restricted by the transmittance of the polarizing plate and sufficient light amounts cannot be ensured in dark places.

The present applicant has therefore proposed a light control device which is improved in contrast ratio and can correctly perform light control operation over a wide range from bright places to dark places by being constructed of a liquid crystal element and a polarizing plate disposed for movement into and out of an effective optical path of light entering this liquid crystal element (refer to Patent Document 2. This invention which relates to Patent Document 2 is hereinafter referred to as the invention of the second prior application.)

The light control device based on the invention of the second prior application is disposed between a front lens group 15 and a rear lens group 16 each constructed of a plurality of lenses like a zoom lens as shown in FIG. 12 by way of example. Light passing through the front lens group 15 enters the GH cell 12b after having been changed into linearly polarized light by the polarizing plate 11. The light passing through the GH cell 12b is converged by the rear lens group 16 and formed on an image pickup plane 17 as an image.

The polarizing plate 11 which constitutes the light control device can be moved into and out of an effective optical path 20 of light entering the GH cell 12b, and can be moved out of the effective optical path 20 by being shifted to the position shown by imaginary lines in FIG. 12.

FIG. 13A is a schematic plan view showing a specific example in which the polarizing plate 11 is secured to a moving part of a mechanical iris for movement into and out of the effective optical path 20.

This mechanical iris is a mechanical diaphragm unit of the type which is generally used in digital still cameras, video cameras and the like, and is mainly made of two iris blades 18 and 19. The polarizing plate 11 is stuck to the iris blade 18.

As shown in FIG. 13B, as the iris blades 18 and 19 are moved upward and downward by means of a driving motor which is not shown, the polarizing plate 11 moves upward and downward together with the iris blade 18. By way of example, FIGS. 13B to 13D show on an enlarged state states which take place near the effective optical path 20 as the iris is gradually stopped down from its fully open state.

FIG. 13B shows the fully open state of the diaphragm, and in this state, the polarizing plate 11 secured to the iris blade 18 is also placed out of the effective optical path 20. As the iris blade 18 and the iris blade 19 are respectively moved upward and downward as shown by arrows 21, the overlap of the iris blades 18 and 19 increases, and an aperture 22 is narrowed as shown in FIG. 13C. At this time, the polarizing plate 11 is moved into the effective optical path 20 and covers part of the aperture 22. Incidentally, FIG. 13A is a general view corresponding to the state of FIG. 13C. FIG. 13D shows a state in which the iris is stopped down to a further extent, and in this state, the polarizing plate 11 covers the whole of the aperture 22.

Accordingly, according to the invention of the second prior application, in dark places, by shifting the polarizing plate 11 out of the effective optical path 20 of light, it is possible to increase the maximum transmittance to at least twice that of a device of the type in which the polarizing plate 11 is fixed, while in bright places, it is possible to realize a light control operation of large optical density ratio by the combination of the polarizing plate 11 and the GH cell 12b.

Accordingly, according to each of the inventions of the first and second prior applications, by constructing a light control device with a liquid crystal element using a guest-host liquid crystal whose host material is made of a negative liquid crystal and a polarizing plate disposed for movement into and out of the optical path of light entering this liquid crystal element, it is possible to provide a light control device which has a large optical density ratio and can perform light control operation over a wide range from bright places to dark places, as well as an image pickup apparatus using the light control device.

Patent Document 1: Japanese Patent Application Publication No. 2001-201769 (FIGS. 1 and 3)

Patent Document 2: Japanese Patent Application Publication No. H11-326894 (FIGS. 1 and 2)

However, in the case of this type of light control device using a GH cell, if high contrast ratio and high optical density ratio are to be realized, there is a need for a polarizing plate movable into and out of an effective optical path, and there is also a need for a moving part for moving the polarizing plate into and out the effective optical path. Accordingly, the light control device has the limitations of being unable to be miniaturized with high contrast ratio realized.

In addition, the GH cell has problems such as the fact that its shading performance is not sufficient and the fact that manufacturing troubles easily occur because of the use of an alignment film.

In view of the circumstances described above, an object of the present invention is to provide a light control device including a liquid crystal element which does not need a polarizing plate and an alignment layer and is compact and high in both contrast ratio and optical density ratio, and further, can be driven at low applied voltage and can exhibit stable performance even if environmental temperature varies, and a driving method for the light control device, as well as an image pickup apparatus using the light control device.

DISCLOSURE OF THE INVENTION

The present inventor has conducted intensive research to solve the above-mentioned problems, and has discovered that if polymer network liquid crystal is used as a liquid crystal material, it is possible to solve the problems by devising the method of use of the polymer network liquid crystal.

Namely, the present invention relates to a light control device which includes a liquid crystal element having liquid crystal sealed between opposed substrates, the liquid crystal being polymer network liquid crystal, the gap between the opposed substrates in an effective optical path being 4-11 μm.

The present invention also relates to a driving method for a light control device which includes a liquid crystal element having liquid crystal sealed between opposed substrates, the liquid crystal being polymer network liquid crystal, the gap between the opposed substrates in an effective optical path being 4-11 μm. The driving method controls an applied voltage for driving the liquid crystal element, according to the environmental temperature of the liquid crystal element. The present invention further relates to an image pickup apparatus in which the light control device is disposed in an optical path of its image pickup system.

According to the light control device of the present invention, since the polymer network liquid crystal is used as the liquid crystal to be sealed into the liquid crystal element and light control operation is performed by using the scattering of light by the polymer network liquid crystal, there is no need for a polarizing plate nor an alignment film. Accordingly, it is possible to fabricate a compact light control device, and it is also possible to avoid troubles associated with the alignment treatment of liquid crystal. In addition, since the liquid crystal molecules of the polymer network liquid crystal form a continuous layer in its three-dimensional network polymer, the polymer network liquid crystal can be driven at low applied voltage.

In addition, the gap between the opposed substrates is made not less than 4 μm at which satisfactory shading performance can be obtained during the opaque state in which driving voltage is not applied, and not larger than 11 μm at which satisfactory light transmittance can be achieved at the applied voltage of 3.3 V which is a practical source voltage, whereby it is possible to realize a light control device which has high contrast ratio (optical density ratio) and can be driven at low applied voltage.

According to the driving method for the light control device of the present invention, the applied voltage for driving the liquid crystal element is controlled according to the environmental temperature of the liquid crystal element, whereby even if the characteristics of the liquid crystal element vary according to the environmental temperature, the liquid crystal element can be made to offer stable light control performance.

In the image pickup apparatus of the present invention, since the light control device of the present invention is disposed in an optical path of its image pickup system, it is possible to effectively use the features of the light control device of the present invention.

Accordingly, the present invention is extremely useful in the miniaturization of light control devices using liquid crystal optical elements and image pickup apparatuses having the light control devices, as well as in the improvement of the performance, image quality and reliability of the light control devices and the image pickup apparatuses.

BRIEF DESCRIPTION OF DRAWINGS

FIGS. 1A to 1D are schematic perspective views and schematic cross-sectional views showing the principle of light control operation of a PN liquid crystal cell based on a mode for carrying out the present invention;

FIG. 4A is a schematic cross-sectional view of a PN liquid crystal cell, while

BEST MODE FOR CARRYING OUT THE INVENTION

Figure 2:
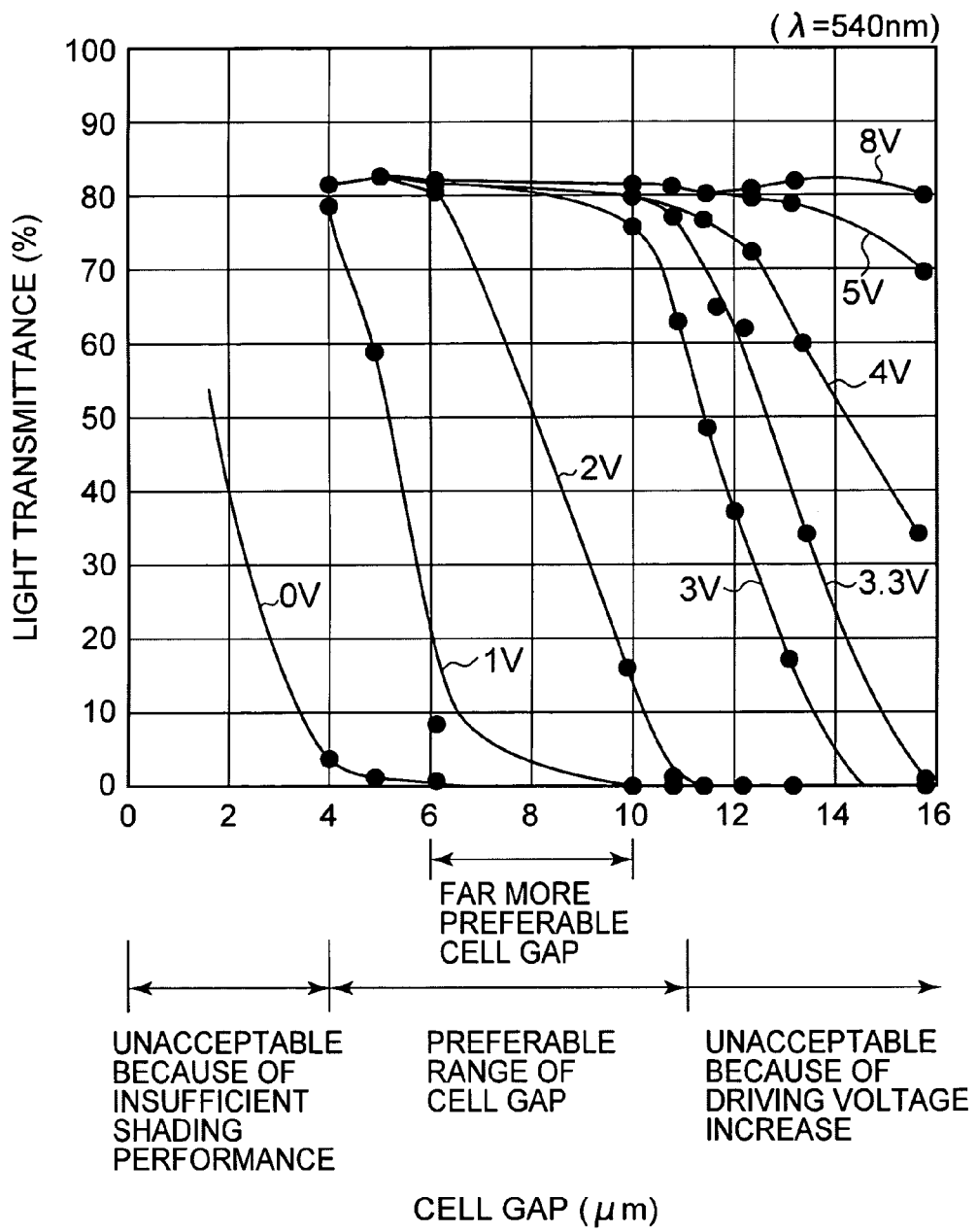
FIG. 2 is a graph showing one comparative example of the relationship between the light transmittance of a PN liquid crystal cell and the cell gap thereof at varied applied voltages.

In the present invention, optically transparent electrodes are preferably provided on the opposed surfaces of the optically transparent opposed substrates, respectively. The gap between the opposed substrates is more preferably 6-10 μm.

The light control device of the present invention is preferably provided with a temperature detecting section which detects the environmental temperature of the liquid crystal element, and a pulse control section which control the applied voltage for driving the liquid crystal element, according to the environmental temperature detected by the temperature detecting section, and the applied voltage is preferably an effective AC pulse voltage.

A preferred embodiment of the present invention will be described below with reference to the accompanying drawings.

Optimization of Cell Gap of Polymer Network (PN) Liquid Crystal Cell

FIGS. 1A and 1B are schematic perspective views showing the principle of light control operation of a polymer network (PN) liquid crystal cell 1, and FIGS. 1B and 1D are schematic cross-sectional views.

The PN liquid crystal cell 1 is fabricated by injecting a mixture in which a liquid crystal material, a polymer precursor such as a monomer or an oligomer, and a polymerization initiator are uniformly mixed into an empty cell constituted by two transparent substrates 8 which are stuck together with a predetermined gap interposed therebetween and on each of whose opposed surfaces a transparent electrode 9 (not shown in either of the schematic perspective views) is formed, and then performing light irradiation or heating under appropriate conditions (such as the wavelength of irradiation light and the intensity, temperature and time of irradiation light) to polymerize the polymer precursor.

In the uniform mixture, when a dense random three-dimensional network polymer (a polymer crosslinked in the form of a network) is formed by polymerization, the generated network polymer 3 and liquid crystal molecules 2 phase-separate to form polymer network liquid crystal having the structure that the polymer 3 is disposed in the continuous layer of the liquid crystal 2 in the form of a three-dimensional network.

When driving voltage is not being applied to the cell, as shown in FIG. 1A, the liquid crystal molecules 2 are aligned along the random wall surfaces of the network polymer 3 while forming a continuous layer in the network polymer 3. As a result, the network polymer 3 forms light scattering interfaces, and the incident light 5 is scattered at the interfaces between the network polymer 3 and the liquid crystal molecules 2.

On the other hand, when driving voltage is being applied to the cell, as shown in FIG. 1C, the liquid crystal molecules are oriented in a predetermined direction with respect to the electric field, so that the directions of the liquid crystal molecules are aligned and the refractive index becomes constant in the traveling direction of light. Accordingly, the incident light 5 passes through without being scattered.

As described above, the light control operation of the PN liquid crystal cell 1 is performed by using variations in the orientation state of the liquid crystal 2 charged into the gaps of the three-dimensional network polymer 3, whereby there is no need for a polarizing plate nor alignment treatment for liquid crystal molecules such as formation of an alignment film.

In addition, the liquid crystal molecules 2 form the continuous layer in the network polymer 3, whereby the liquid crystal molecules 2 can be driven at low applied voltage.

FIG. 2 is a graph showing one comparative example of the relationship between the light transmittance of a PN liquid crystal cell and the cell gap thereof (the gap between its transparent substrates) at varied applied voltages (the environmental temperature of each liquid crystal element is 25° C.). For example, the upper limit of a cell gap capable of achieving a light transmittance of 80% becomes larger at higher applied voltages, and is approximately 4 µm at an applied voltage of 1 V, slightly larger than 6 µm at an applied voltage of 2 V, slightly less than 9 µm at an applied voltage of 3 V, and approximately 10 µm at an applied voltage of 3.3 V. Contrarily, in the case of a fixed cell gap, the light transmittance becomes larger at higher applied voltages; for example, in the case of a cell gap of 10 µm, the light transmittance is slightly less than 15% at an applied voltage of 2 V and approximately 75% at an applied voltage of 3 V, and reaches approximately 80% at an applied voltage of 3.3 V, whereas in the case of a cell gap of 11 µm, the light transmittance is approximately 5% at an applied voltage of 2 V, approximately 60% at an applied voltage of 3 V, and approximately 72-73% at an applied voltage of 3.3 V, and reaches as low as 77-78% even at an applied voltage of 4 V.

As described above, as the cell gap becomes larger, the driving voltage necessary to achieve the maximum transmittance becomes higher. For example, if the transmittance necessary for light control operation is assumed to be over 70%, when the cell gap is larger than 11 µm, the driving voltage necessary to light control operation exceeds 3.3 V and becomes higher than the source voltages used in general consumer appliances, so that a booster circuit becomes necessary to supply this driving pulse. Accordingly, the cell gap is preferably not larger than 11 µm so that a transmittance of over 70% can be achieved by using a source voltage of 3.3 V without boosting, more preferably not larger than 10 µm so that a maximum cell transmittance of slightly larger than 80% can be achieved.

On the other hand, in the case of an extremely small cell gap, when the cell is opaque with the driving voltage off, the proportion of light which passes through the cell without being scattered therein increases, and the shading performance lowers. This corresponds to the graph of an applied voltage of 0 V in FIG. 2. If the cell gap exceeds 6 µm, the light transmittance of the cell which is opaque is negligibly small, but if the cell gap is smaller than 4 µm, the light transmittance exceeds 3-4%, so that it is impossible to satisfactorily use the merit of PN liquid crystal cells capable of ensuring high contrast ratio with a cell alone without a polarizing plate in a compact manner. Accordingly, the cell gap is preferably not less than 4 µm so that satisfactory shading performance can be achieved, more preferably not less than 6 µm so that more complete shading performance can be achieved.

As described above, if an actual light control device effectively using the merit of a PN liquid crystal element is to be realized, the gap (cell gap) between its transparent substrates is controlled, preferably to 4-11 µm, more preferably to 6-10 µm.

Figure 3:
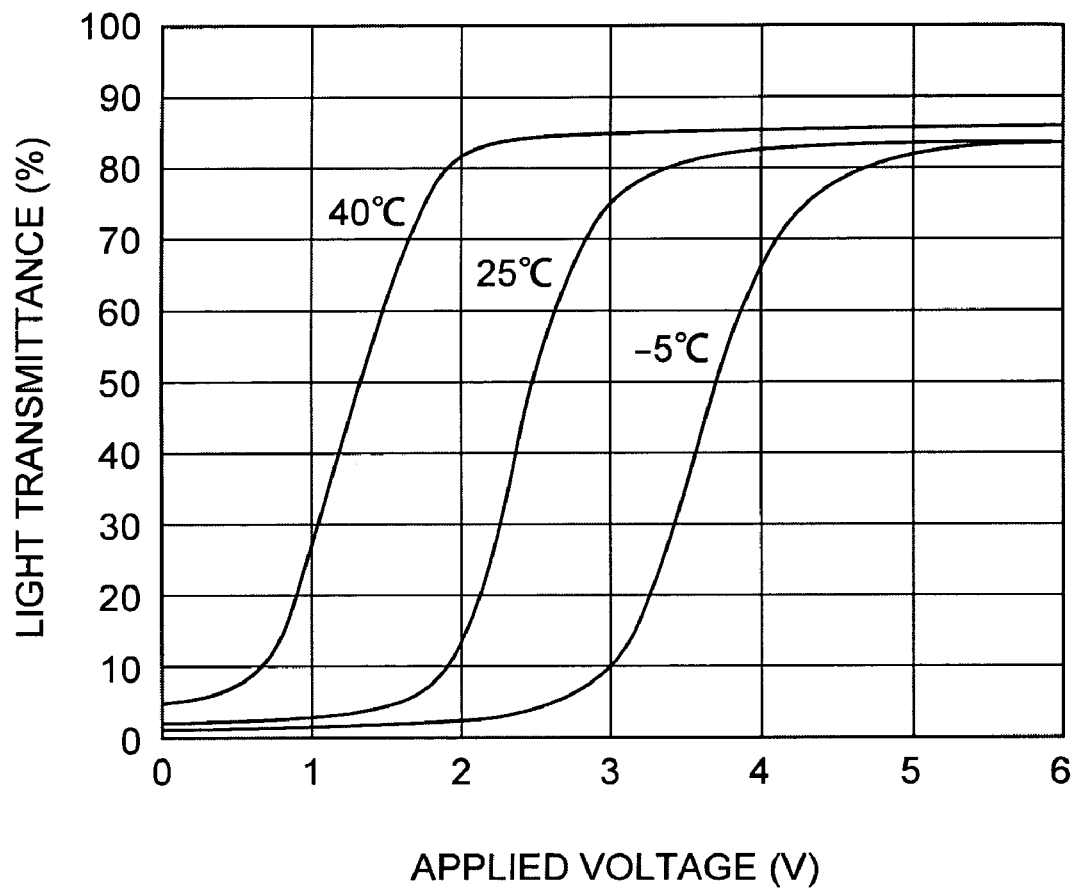
FIG. 3 is a graph showing one comparative example of the relationship between the light transmittance and the applied voltage of a PN liquid crystal cell at varied operating environmental temperatures of a liquid crystal element.

Temperature Dependence of Applied Voltage of Polymer Network (PN) Liquid Crystal Cell FIG. 3 is a graph showing one comparative example of the relationship (so-called V-T characteristic) between the light transmittance of a PN liquid crystal cell and the applied voltage according to an embodiment which will be described later, at varied environmental temperatures of the liquid crystal element (the cell gap in this case is 10.7±0.1 µm.) It can be seen that as the environmental temperature decreases from 40° C. to 25° C. to −5° C., the V-T characteristic shifts toward the right and higher applied voltages become necessary.

Unlike GH cells, PN liquid crystal cells do not need liquid crystal alignment films and their transient response times are not greatly influenced by their cell gaps. However, as shown in FIG. 3, their V-T characteristics are very strongly influenced by environmental temperature. This is considered to be because when the temperature is high, liquid crystal molecules exhibit active thermal motion, and hence, good response to electric fields, so that small applied voltages are sufficient, but as the temperature becomes lower, the motion of the liquid crystal molecules become slower and their responses to electric fields become lower, so that higher applied voltages become necessary to achieve the same light transmittance.

Accordingly, in consideration of this temperature characteristic, by constantly monitoring the environmental temperature of a PN liquid crystal element and optimally controlling an effective applied voltage for driving the liquid crystal cell, according to the detected environmental temperature, it is possible to realize a light control device capable of offering stable light control performance even if the environmental temperature varies.

Light Control Device

Figure 4A:
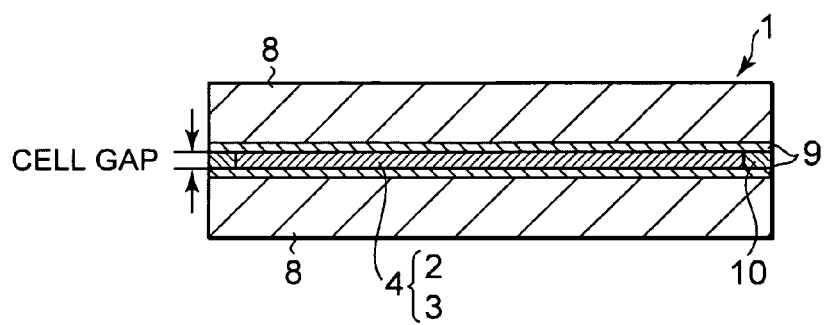

FIG. 4A is a schematic cross-sectional view of the PN liquid crystal cell 1. In the PN liquid crystal cell 1, the two transparent substrates 8 having inside opposed surfaces on which the two transparent electrodes 9 are respectively formed are held to oppose each other with a predetermined cell gap interposed therebetween, and a polymer network liquid crystal 4, which is made of a continuous layer of the liquid crystal molecules 2 in which the three-dimensional network polymer 3 is formed, is formed in the gap between the two transparent substrates 8.

As the transparent substrates 8, glass substrates are generally used, but are not limitative, and plastic substrates and the like may also be used. As the transparent electrodes 9, transparent conductive layers such as ITO (Indium Tin Oxide), FTO (Fluorine-doped tin oxide: tin oxide doped with fluorine) and ATO (Antimony-doped tin oxide: tin oxide doped with antimony) are formed by vapor deposition and the like.

The PN liquid crystal cell 1 is fabricated, for example, in the following manner. First, the peripheral portion of the transparent substrates 8 on which the transparent electrodes 9 are respectively formed in advance is coated to a predetermined width with a sealing (seal) material 10 made of a thermosetting epoxy resin. This sealing material 10 contains, as spacers, a glass fiber having the same diameter as the cell gap. Then, the two transparent substrates 8 are aligned and superposed on each other, and are then subjected to heat treatment in the state of being pressed under appropriate conditions (for example, 150-170° C., 1-2 kg/cm$^2$) by means of a heat press plate or the like, thereby curing the sealing material 10 in the peripheral portion to fabricate an empty cell in which liquid crystal is not yet sealed.

Then, the interior of the empty cell is evacuated to vacuum, and a mixture in which a liquid crystal material, a polymer material such as polymer precursor, and a polymerization initiator are uniformly mixed is injected into the interior of the empty cell. After that, this mixture is irradiated with ultraviolet rays under appropriate conditions (for example, 15-100 mW/cm$^2$, 25-50° C., 30-120 seconds) to polymerize monomers and form the polymer network liquid crystal 4, thereby finishing the PN liquid crystal cell 1.

The liquid crystal material may be of any kind that is generally accepted as a liquid crystal material in this technical field, and is not limited to a single liquid crystal compound and may also be a mixture which contains two or more kinds of liquid crystal compounds as well as substances other than liquid crystal compounds.

The liquid crystal material preferably has positive dielectric constant anisotropy. In addition, nematic liquid crystal, smectic liquid crystal and cholesteric liquid crystal are preferable, and uniaxial nematic liquid crystal is particularly preferable. The liquid crystal material may further appropriately contain an substance for improving its performance.

The polymer precursor may be, for example, a monomer and/or an oligomer prepared by radical addition polymerization, a monomer and/or an oligomer prepared by cation addition polymerization, and a monomer and/or an oligomer prepared by ring-opening polymerization. A three-dimensional network polymer having gaps of desired size may also be formed in advance so that further polymerization is performed by using this network polymer as a material.

Specific examples of the liquid crystal material and the polymer material are described in Japanese Patent Application Publication No. 2000-66173 and the like.

Figure 4B:
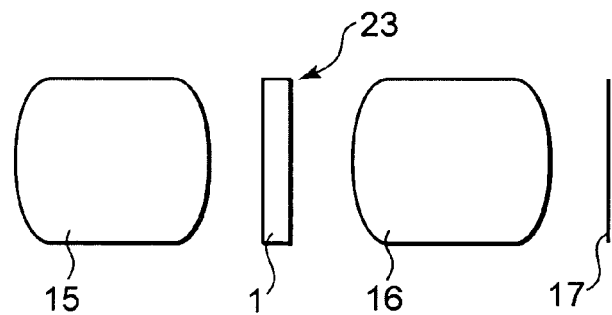
FIG. 4B is a schematic side view of a light control device using the PN liquid crystal cell.

FIG. 4B is a schematic side view of a light control device using the PN liquid crystal cell 1. A light control device 23 is basically made of only the PN liquid crystal cell 1. If necessary, an iris unit such as a mechanical iris may be added. The PN liquid crystal cell 1 is disposed between a front lens group 15 and a rear lens group 16 each constructed of a plurality of lenses, for example, like a zoom lens. Light passing through the front lens group 15 enters the PN liquid crystal cell 1, and the light passing through the PN liquid crystal cell 1 is converged by the rear lens group 16 and formed on an image pickup plane 17 as an image.

Image Pickup Apparatus

Figure 5:
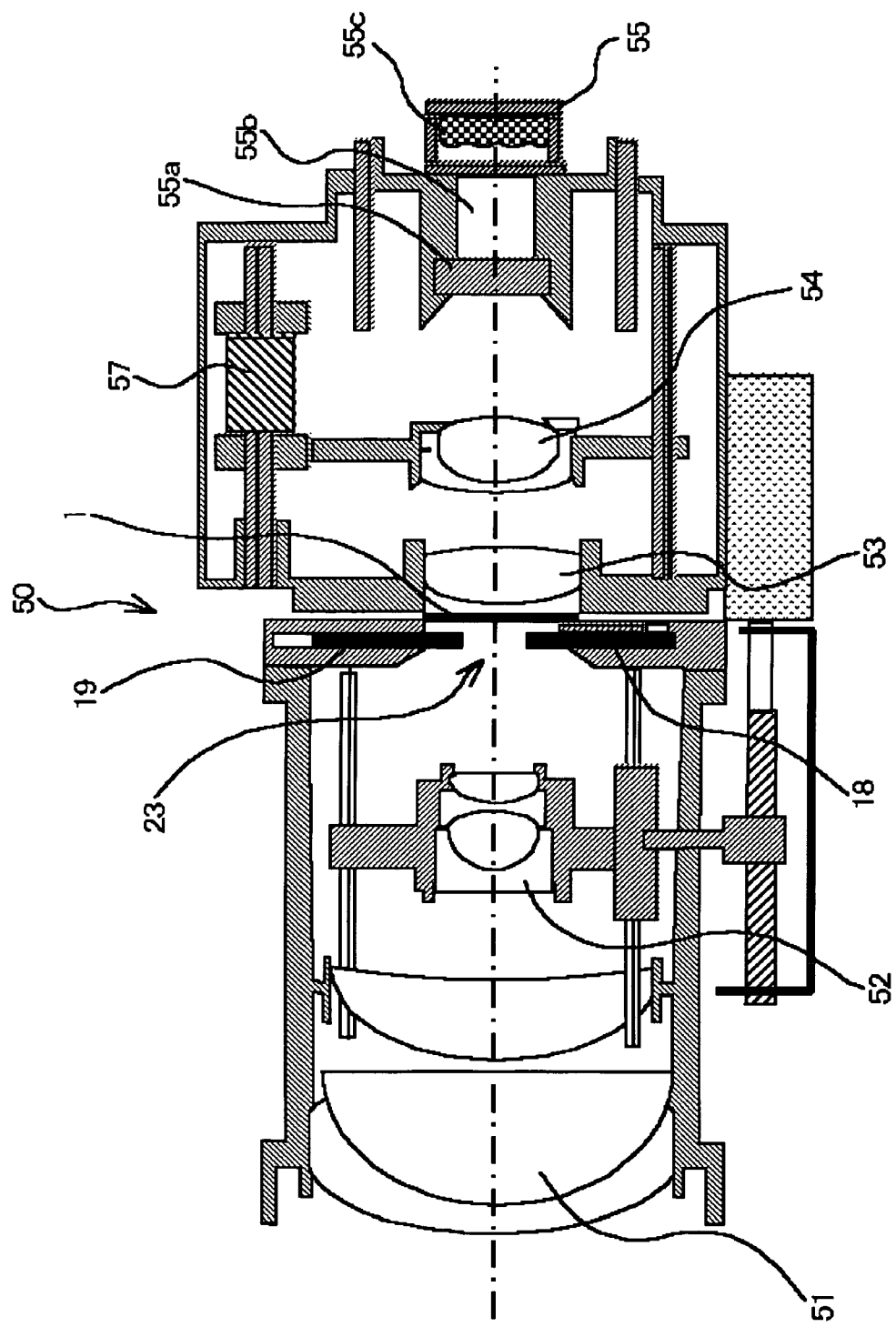
FIG. 5 is a schematic cross-sectional view of a camera system in which a light control device is incorporated.

FIG. 5 shows an example of a CCD (Charge coupled device) camera in which the light control device 23 according to the present embodiment is incorporated.

Namely, in a CCD camera 50, a first lens group 51 and a second lens group (for zooming) 52 which correspond to the front lens group 15, a third lens group 53 and a fourth lens group (for focusing) 54 which correspond to the rear lens group 16, and a CCD package 55 are arranged in that order at appropriate space intervals along an optical axis shown by a dot-dashed line, and an infrared cut-off filter 55$a$, an optical low-pass filter unit 55$b$ and a CCD image pickup element 55$c$ are incorporated in the CCD package 55.

The light control device 23 made of the PN liquid crystal cell 1 based on the above-mentioned invention is secured on the same optical path between the second lens group 52 and the third lens group 53 at a position closer to the third lens group 53 for the purpose of controlling the amount of light (reducing the amount of light). The fourth lens group 54 for focusing is disposed for movement between the third lens group 53 and the CCD package 55 along the optical path by means of a linear motor 57. The second lens group 52 for zooming is disposed for movement between the first lens group 51 and the light control device 23 along the optical path.

Driving Circuit

Figure 6:
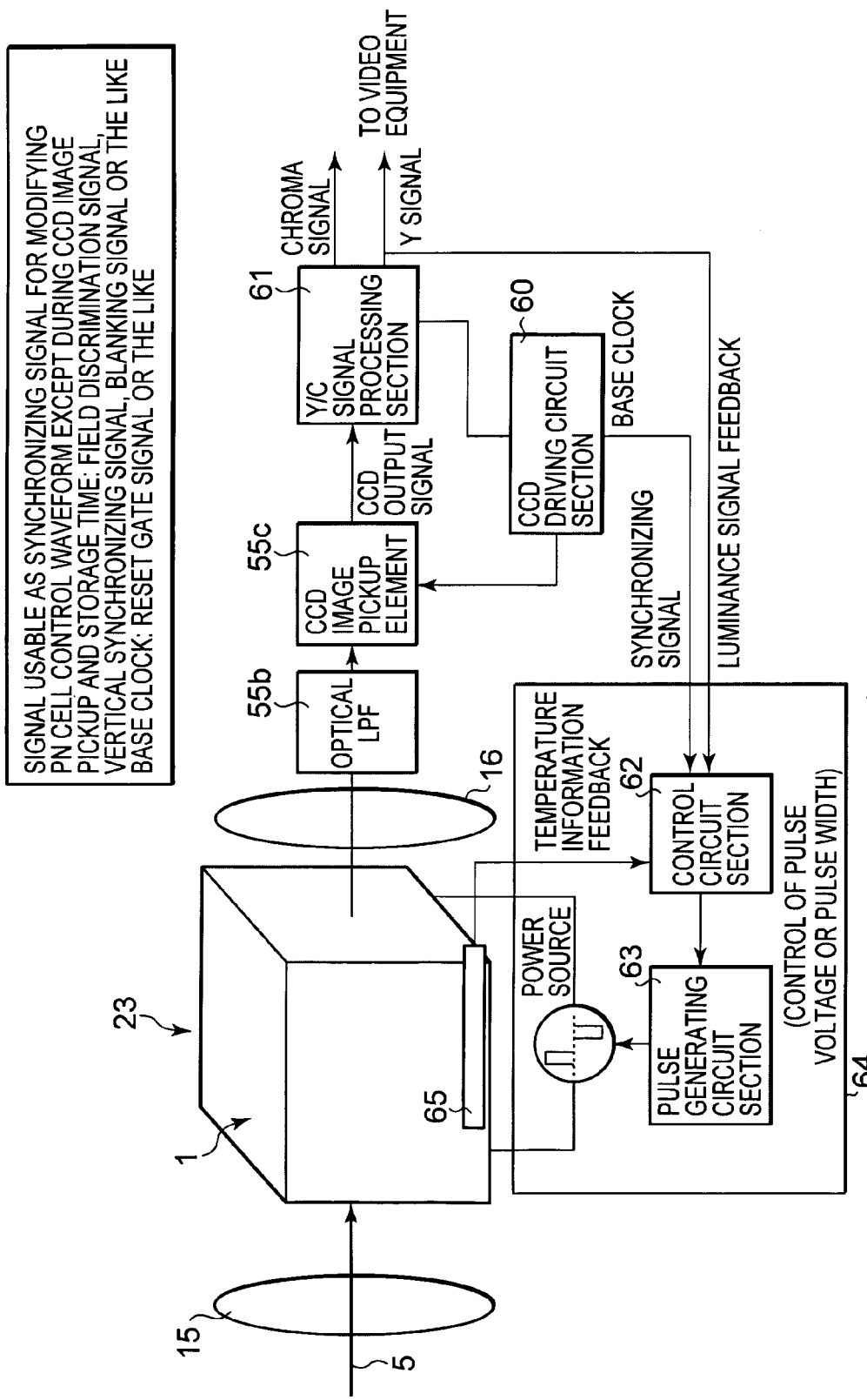
FIG. 6 is a block diagram including a driving circuit of a camera system.

FIG. 6 is a block diagram of the driving circuit of the above-mentioned CCD camera.

According to this drawing, a CCD image pickup element 55$c$ is disposed on the light exit side of the light control device 23, and a CCD driving circuit section 60 is connected to the CCD image pickup element 55$c$. The output signal of the CCD image pickup element 55$c$ is processed in a Y/C signal processing section 61, and a luminance signal (Y signal) is fed back to a control circuit section 62 of a PN liquid crystal cell driving control unit 64.

The PN liquid crystal cell driving control unit 64 which also generates driving pulses to be applied to the PN liquid crystal cell 1 is made of the control circuit section 62 and a pulse generating circuit section 63, and generates driving pulses which are controlled in frequency, pulse voltage and pulse width. The environmental temperature of the PN liquid crystal cell 1 is detected by a thermistor 65, and this detected temperature information is inputted to the control circuit section 62.

The flow of a control signal is as follows. The luminance information (Y signal) from the Y/C signal processing section 61 and the environmental temperature information of the PN liquid crystal cell 1 are fed back to the control circuit section 62 of the PN liquid crystal cell driving control unit 64 together with base clocks outputted from the CCD driving circuit section 60. The control signal generated by the control circuit section 62 in response to these signals is inputted to the pulse generating circuit section 63. Then, in the pulse generating circuit section 63, AC pulses whose effective pulse voltage is optimally controlled according to the detected environmental temperature of the PN liquid crystal cell 1 are generated in synchronism with the base clocks, and are applied to the PN liquid crystal cell 1.

It is to noted that the light control device and the image pickup apparatus according to the present invention are suited to the case where driving electrodes for the liquid crystal element are formed over at least the entire area of an effective light transmission section. By controlling driving pulses to be applied to the driving electrodes formed in this state, it is possible to perform total control on light transmittance with high accuracy over the entire effective optical path width.

As described above, according to the light control device according to the embodiment of the present invention, and the driving method for the same, as well as the image pickup apparatus using the light control device, the cell gap of the PN liquid crystal cell using the polymer network liquid crystal is controlled to 4-11 µm and an effective voltage to be applied to the cell is optimized, whereby light control operation which is high in contrast ratio and optical density ratio can be realized in a compact form without using a polarizing plate and at low applied voltage. The light control device can stably offer its performance even if the environmental temperature varies. In addition, since an alignment film is not used, it is possible to avoid troubles associated with the alignment treatment of liquid crystal.

Embodiment

A preferred embodiment of the present invention will be specifically described below with reference to the accompanying drawings.

The PN liquid crystal cell 1 shown in the fabrication view 4A of the PN liquid crystal cell was fabricated in the following manner. First, the peripheral portion of the transparent substrates on which the patterns of the transparent electrodes 9 using ITO films were respectively formed in advance was coated to a predetermined width with the sealing (seal) material 10 made of a thermosetting epoxy resin. This sealing material 10 was made to contain, as spacers, a glass fiber of diameter 10.8 µm.

Then, the two transparent substrates 8 were aligned and superposed on each other, and were then subjected to heat treatment with 150-170° C. and 1-2 kg/cm$^2$ by means of a heat press plate, thereby curing the sealing material 10 in the peripheral portion to fabricate an empty cell in which liquid crystal was not yet sealed.

The cell gap of the obtained liquid crystal was measured with a measuring device using the interference of light. The gap in the cell center was approximately 10.6 µm, and the gap in the cell periphery was approximately 10.8 µm.

The interior of this empty cell was evacuated to vacuum, and after PNM-172 manufactured by DAINIPPON INK AND CHEMICALS, INCORPORATED (a mixture of liquid crystal and monomers and the like) was injected into the empty cell as a PN liquid crystal material, the monomers were polymerized by irradiation with ultraviolet rays under the conditions of 15-100 mW/cm$^2$, 25-50° C. and 30-120 seconds, whereby the polymer network liquid crystal 4 was formed between the two transparent electrodes 9 and the PN liquid crystal cell 1 was finished.

Figure 7:
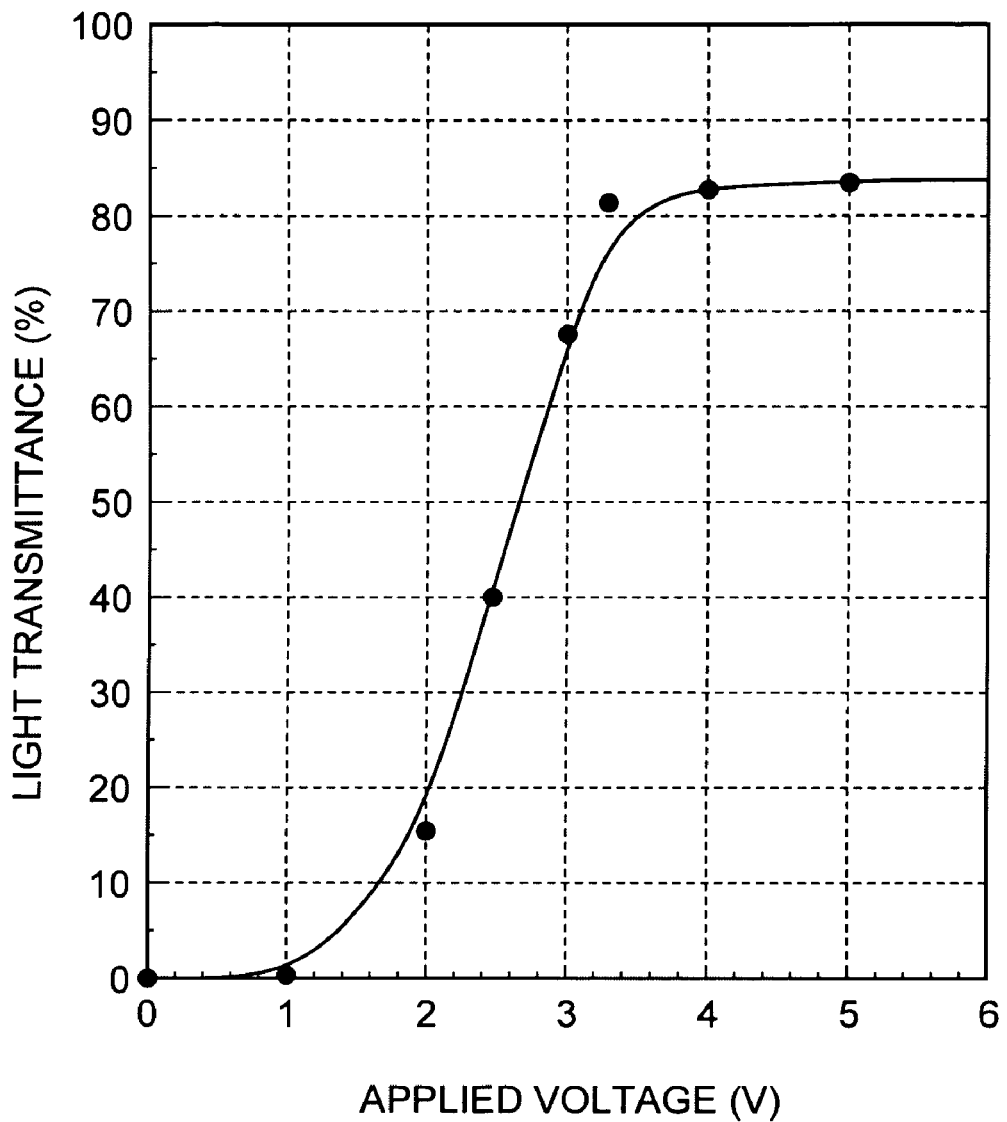
FIG. 7 is a graph showing the relationship between the light transmittance and the applied voltage of the PN liquid crystal cell according to an embodiment of the present invention.
Figure 8A:
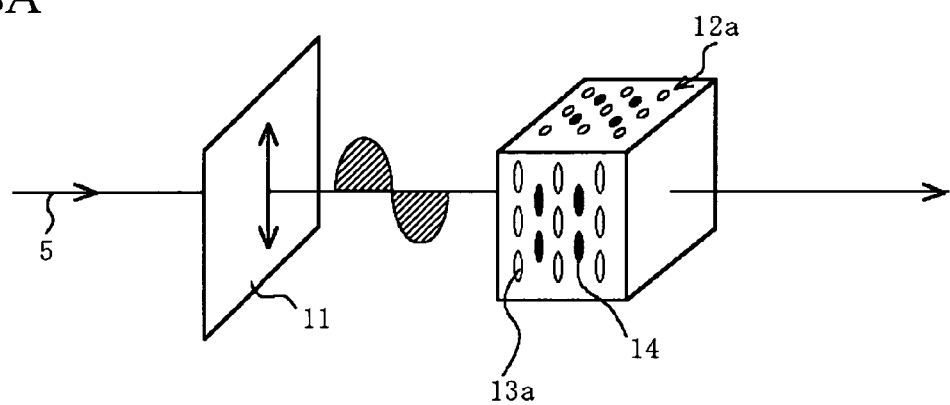
FIGS. 8A and 8B are schematic explanatory views showing the operating principle of a related art light control device using a GH cell.
Figure 8B:
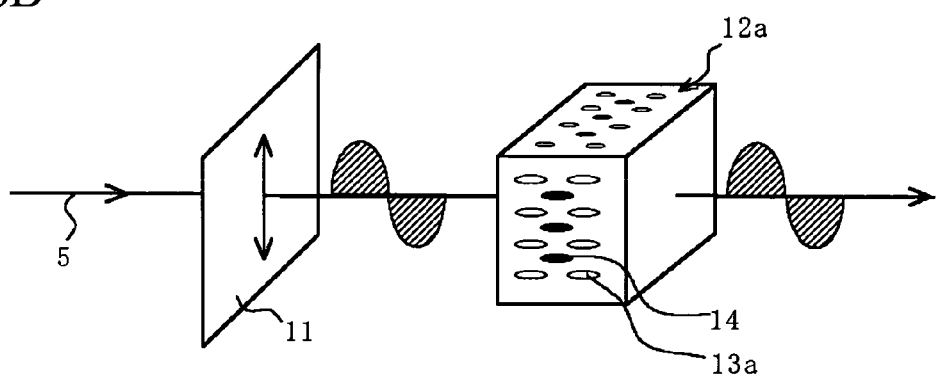
Figure 9:
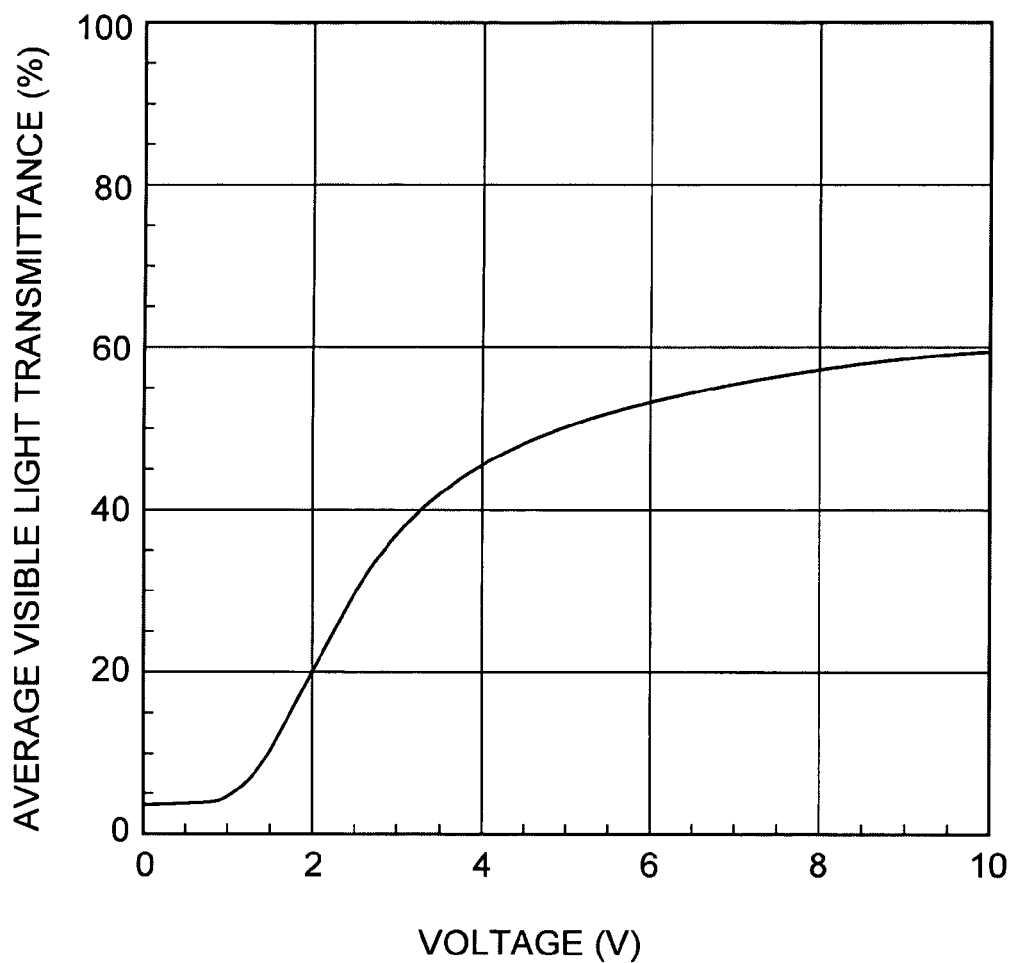
FIG. 9 is a graph showing the relationship between the light transmittance and the applied voltage of the related art light control device using a GH cell.
Figure 10A:
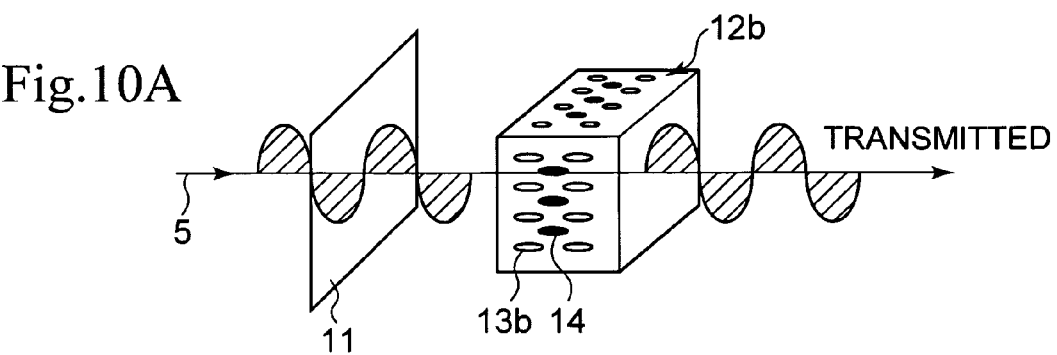
FIGS. 10A to 10C are schematic views showing the operating principle of a light control device using a GH cell based on the invention of the first prior application.
Figure 10B:
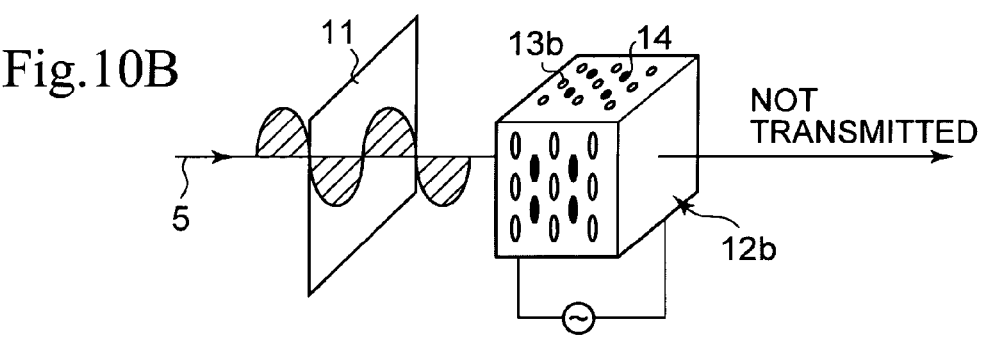
Figure 10C:
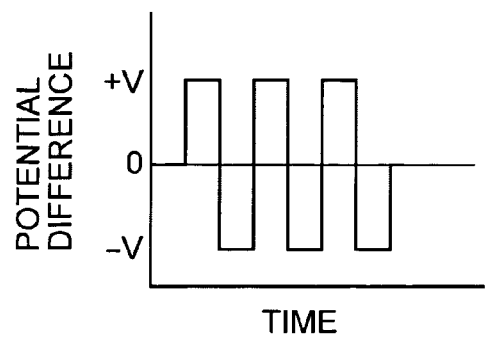
Figure 11:
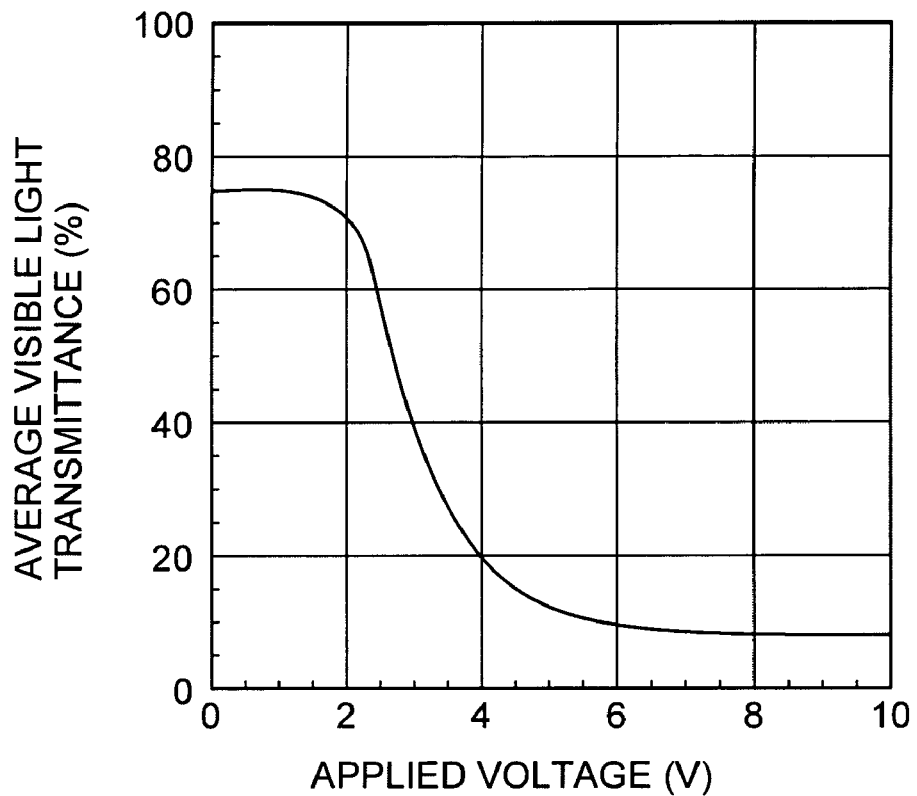
FIG. 11 is a graph showing the relationship between the light transmittance and the applied voltage of a light control device using a GH cell.
Figure 12:
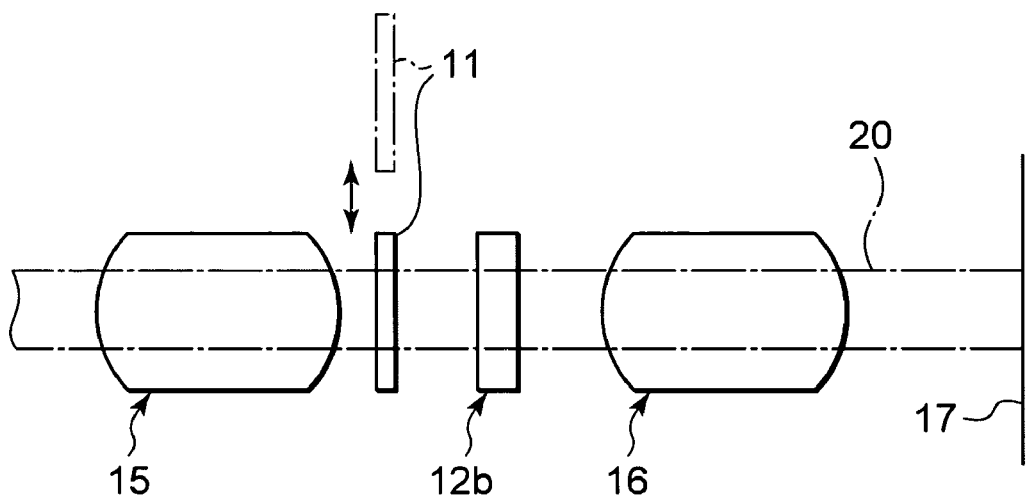
FIG. 12 is a schematic side view of a light control device using a GH cell and a polarizing plate based on the invention of the second prior application.
Figure 13A:
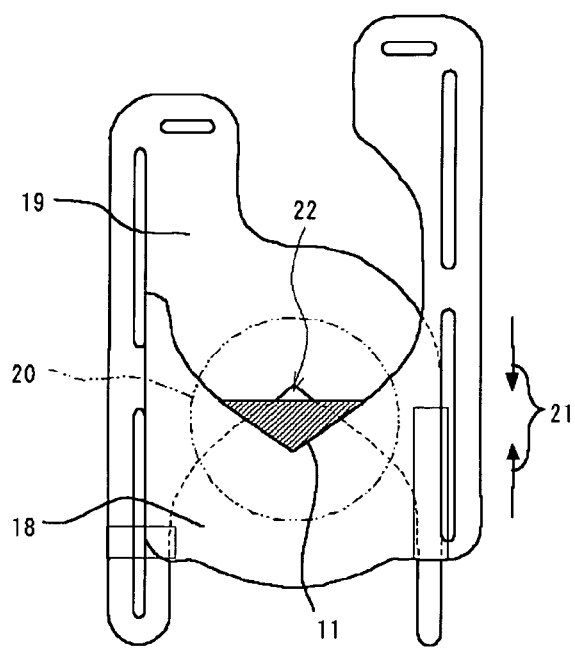
FIGS. 13A to 13D are a front view of a mechanical iris to which a polarizing plate is secured, and partial enlarged views showing light control operation occurring near an effective optical path of the mechanical iris.
Figure 13B:
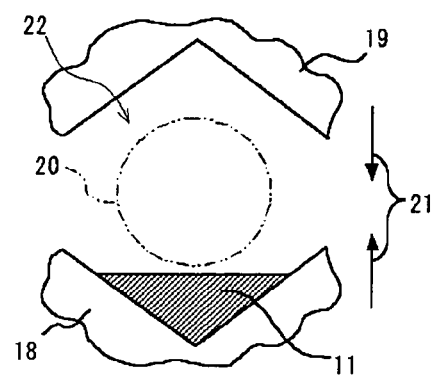
Figure 13C:
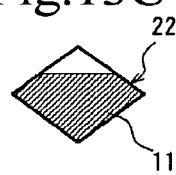
Figure 13D:
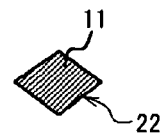

FIG. 7 is a graph showing the relationship (V-T characteristic) between the light transmittance of the light control device using the finished PN liquid crystal cell 1 and the voltage applied to the PN liquid crystal cell 1. Variations in the light transmittance were measured while driving pulses of rectangular waves were being applied. As the applied voltage increased, the average visible light transmittance increased from a minimum transmittance of several % to over 80%.

Although this V-T characteristic differs according to liquid crystal cell structures or constituent materials to be used, the PN liquid crystal cell 1 according to the present embodiment reached a maximum transmittance of approximately 82% with respect to the application of a pulse voltage of ±4 V or more (50 Hz).

FIG. 3 shows the V-T characteristic at each of the environmental temperatures of 40° C., 25° C. and −5° C. It can be seen that as the environmental temperature decreases, the V-T characteristic shifts toward the right and higher applied voltages become necessary. Accordingly, in consideration of this temperature characteristic, by constantly monitoring the environmental temperature of the PN liquid crystal element and optimally controlling an effective driving pulse voltage to be applied to the liquid crystal cell, according to the detected environmental temperature, it is possible to realize the light control device capable of performing stable light control performance even if the environmental temperature varies.

Although the invention of the present application has been described above on the basis of the mode for carrying out the invention as well as the embodiments, the present invention is not limited to any of these examples, and it goes without saying that it is possible to select appropriate ones from among sample structures, materials to be used, driving methods for liquid crystal cells, the forms of light control devices, driving mechanisms and the like, without departing from the gist of the invention.

For example, in the present embodiment, reference has been made to an example using pulse voltage modulation (PHM) as a driving method for a liquid crystal cell, but the present embodiment can also be applied to the case in which the liquid crystal cell is driven by pulse width modulation (PWM).

In addition, the light control device according to the present invention can be widely applied to not only optical diaphragm units for image pickup apparatuses such as the above-mentioned CCD camera, but also various optical systems for light amount control for electrophotographic copying machines, optical communication equipment and the like.

In addition, the light control device according to the present invention can of course be applied to not only image pickup devices such as CCDs (Charge Coupled Devices) of the type used in the present embodiment, but also CMOS (Complementary Metal-Oxide Semiconductor) image sensors and the like.

Furthermore, the light control device according to the present invention can be applied to not only optical filters but also various image display elements for displaying characters or images.

Furthermore, the structure and the material of the above-mentioned liquid crystal optical element as well as the constructions and the like of the driving mechanism, the driving circuit and the control circuit of the liquid crystal optical element can be variously modified. From among rectangular waves, trapezoidal waves, triangular waves and sine waves, any driving waveform can be used for driving, whereby the orientation of liquid crystal is varied according to the potential difference between two electrodes which constitute the liquid crystal cell, to control the light transmittance thereof. In addition, means for measuring the environmental temperature of the liquid crystal element is not limited to a thermistor, and may also use other temperature sensors.

INDUSTRIAL APPLICABILITY

According to the light control device of the present invention, since polymer network liquid crystal is used as liquid crystal to be sealed into its liquid crystal element and light control operation is performed by using the scattering of light by the polymer network liquid crystal, there is no need for a polarizing plate nor an alignment film. Accordingly, it is possible to fabricate a compact light control device, and it is also possible to avoid troubles associated with the alignment treatment of liquid crystal. In addition, since the liquid crystal molecules of the polymer network liquid crystal form a continuous layer in its three-dimensional network polymer, the polymer network liquid crystal can be driven at low applied voltage.

In addition, the gap between the opposed substrates is made not less than 4 µm at which satisfactory shading performance can be obtained during the opaque state in which driving voltage is not applied, and not larger than 11 µm at which satisfactory light transmittance can be achieved at the applied voltage of 3.3 V which is a practical source voltage, whereby it is possible to realize a light control device which has high contrast ratio (optical density ratio) and can be driven at low applied voltage.

According to the driving method for the light control device of the present invention, the applied voltage for driving the liquid crystal element is controlled according to the environmental temperature of the liquid crystal element, whereby even if the characteristics of the liquid crystal element vary according to the environmental temperature, the liquid crystal element can be made to offer stable light control performance.

In the image pickup apparatus of the present invention, since the light control device of the present invention is disposed in an optical path of its image pickup system, it is possible to effectively use the features of the light control device of the present invention.

Accordingly, the present invention is extremely useful in the miniaturization of light control devices using liquid crystal optical elements and image pickup apparatuses having the light control devices, as well as in the improvement of the performance, image quality and reliability of the light control devices and the image pickup apparatuses.

The invention claimed is:

1. A light control device comprising:
    opposing substrates with a gap therebetween;
    liquid crystal in said gap sealed between said opposing substrates, said liquid crystal being a polymer network liquid crystal;
    optically transparent electrodes on gap-side surfaces of each of said opposing substrates and in contact with said liquid crystal;
    an image processing unit which detects a luminance signal of said liquid crystal;
    a temperature detecting unit which detects a temperature of said liquid crystal; and
    a pulse control unit which controls a width of a pulse of an applied voltage for driving said liquid crystal, the pulse control unit controlling said width of said pulse according to both of said temperature detected by said temperature detecting unit and said luminance detected by said image processing unit,
    wherein,
    said gap between said opposing substrates along an effective optical path has a width between about 4 µm and about 11 µm.

2. The light control device according to claim 1, wherein said gap width is between about 6 and 10 µm.

3. The light control device according to claim 1, wherein said opposing substrates are optically transparent.

4. The light control device according to claim 1, wherein said applied voltage is an AC pulse voltage.

5. A method for driving a light control device having opposing substrates with a gap therebetween, liquid crystal in said gap sealed between said opposing substrates, said liquid crystal being a polymer network liquid crystal, optically transparent electrodes on gap-side surfaces of each of said opposing substrates and in contact with said liquid crystal, an image processing unit which detects a luminance signal of said liquid crystal, a temperature detecting unit which detects a temperature of said liquid crystal, a pulse control unit which controls a width of a pulse of an applied voltage for driving said liquid crystal based on both of said temperature detected by said temperature detecting unit and said luminance signal detected by said image processing unit, and said gap between said opposing substrates along an effective optical path has a width between about 4 µm and about 11 µm, said driving method comprising:
    applying a voltage for driving said liquid crystal element;
    detecting a temperature of said liquid crystal element; and
    controlling said applied voltage for driving said liquid crystal element, according to the detected temperature of said liquid crystal element.

6. The method for driving a light control device according to claim 5, wherein said applied voltage is an AC pulse voltage.

7. An image pickup apparatus, wherein the light control device according to any of claims 1, 2, 3, or 4 is disposed in an optical path of an image pickup system of said image pick up apparatus.

8. The light control device according to claim 1, wherein said detected temperature is an environmental temperature.

* * * * *